United States Patent
Wiegand, Sr., deceased et al.

[11] 3,882,023
[45] May 6, 1975

[54] APPARATUS FOR CONTINUOUSLY SEPARATING LIQUID AND SOLID FROM A LIQUID-SOLID MIXTURE

[76] Inventors: Vernon I. E. Wiegand, Sr., deceased, late of Cincinnati, Ohio; by Florence Elliott Wiegand, executrix, 1943 Green Pine Dr., Cincinnati, Ohio 45231

[22] Filed: Nov. 21, 1972

[21] Appl. No.: 308,420

[52] U.S. Cl. .............................. 210/294; 100/121
[51] Int. Cl. ............................................ B01d 17/00
[58] Field of Search .......... 210/66, 67, 68, 71, 386, 210/394, 403, 322, 294; 100/121, 157, 41

[56] References Cited
UNITED STATES PATENTS

| | | | |
|---|---|---|---|
| 2,306,655 | 12/1942 | Truax | 100/157 |
| 2,374,046 | 4/1945 | Stacom | 100/157 |
| 2,374,047 | 4/1945 | Stacom | 100/41 |
| 3,091,335 | 5/1963 | Goard | 210/71 |
| 3,220,340 | 10/1965 | Frykhult | 100/121 |
| 3,342,124 | 9/1967 | Frykhult | 100/121 |
| 3,730,343 | 5/1973 | Pause et al | 210/68 |

*Primary Examiner*—Charles N. Hart
*Assistant Examiner*—Benoit Castel

[57] ABSTRACT

Liquid and solid is continuously separated from a flowable solid-liquid mixture in apparatus which moves such mixture through a horn angle defined by a pair of liquid impervious, continuous non-variant surfaces toward a compression nip which squeezes liquid from the mixture and passes solid through the nip. The structure includes a pair of longitudinally aligned cylinders, a smaller cylinder eccentrically mounted within the hollow interior of the other cylinder. The hollow interior is enclosed by end plates which carry the cylinders rotatably through liquid seal members. A baffle mounted between the end members within the hollow interior divides the interior into two sections for wet and dried material. Means are provided to introduce the mixture into the wet material section and means are provided to remove liquid from the wet section and dried material from the other section. The apparatus can include means to heat or to cool the hollow interior such as to a sterilizing temperature or for reduced temperature processing.

3 Claims, 5 Drawing Figures

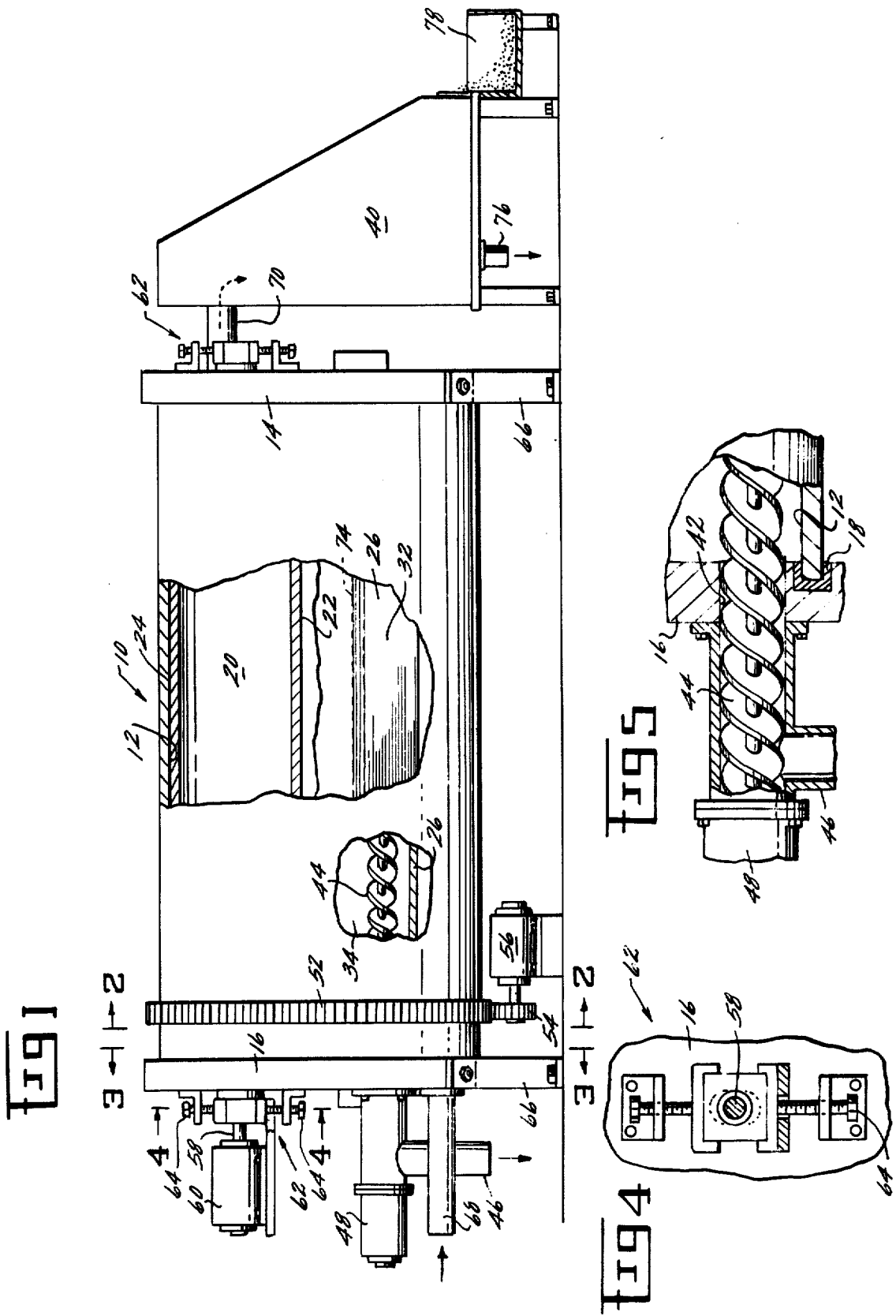

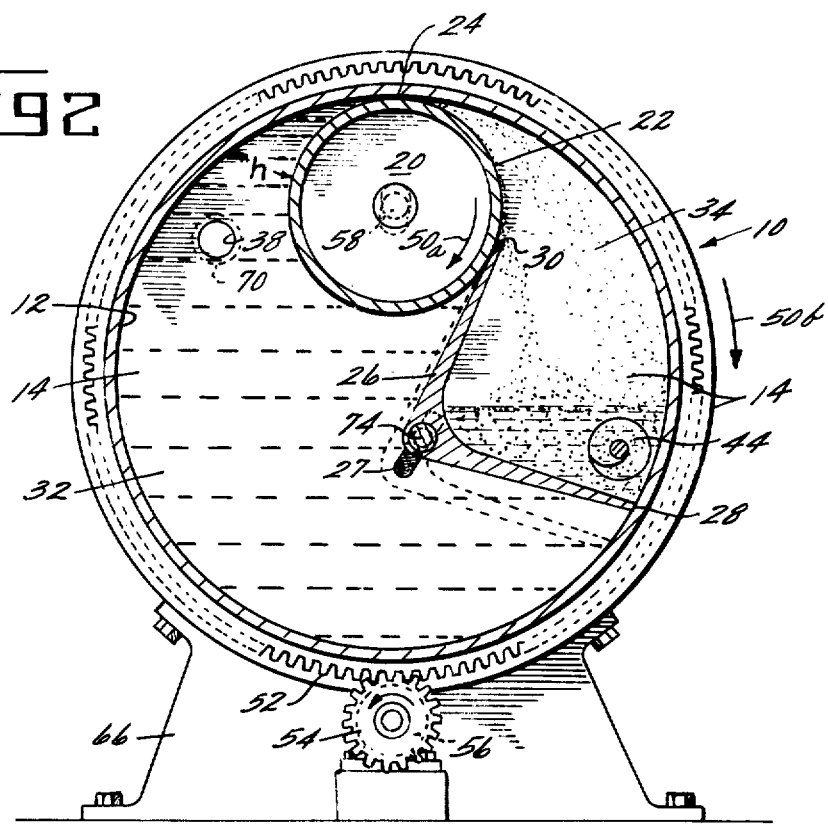
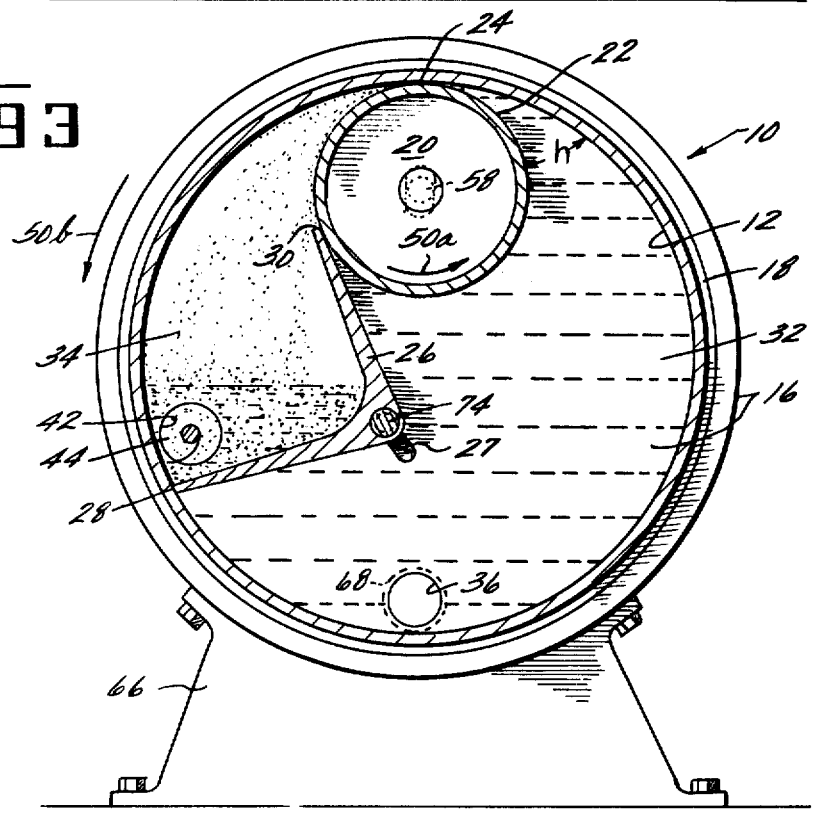

APPARATUS FOR CONTINUOUSLY SEPARATING LIQUID AND SOLID FROM A LIQUID-SOLID MIXTURE

BACKGROUND OF THE INVENTION

This invention relates to apparatus for separating liquids and solids from a mixture of the two. More particularly, it relates to such adjustable apparatus which operates continuously.

Removal of any liquid, more commonly water, from solid-liquid mixtures is a major operation and cost in a variety of industries. In some industries, such liquid removal is necessary to create the product being manufactured, for example, as in the paper industry and in sugar refining. In other cases, such as sewage disposal, it is the reclamation primarily of the liquid which is desired although, in some instances, the by product solid or dried material is otherwise useful.

Whatever the application in industry or environmental improvement, separation of a liquid from such a mixture has been slow and expensive such that in some cases many waste materials are destroyed rather than recovered because the recovery methods are economically unattractive. In other cases, apparatus has required considerable maintenance so as to limit its use as a continuous and instantaneous liquid removal means.

SUMMARY OF THE INVENTION

It is a principal object of the present invention to provide, for continuously and economically removing liquid from a solid-liquid mixture, apparatus which is simply and economically constructed, easily maintained and fully adjustable in operation and magnitude to be useful with a variety of solid-liquid mixtures.

Another object is to provide such apparatus which is simplified in construction to allow heating or cooling of the interior.

These and other objects and advantages of the present invention will be more fully appreciated and recognized from the following detailed description and the drawing all of which are typical of but not intended to be limiting on the scope of the present invention.

In one form of the apparatus aspect of the present invention there is provided a pair of cylindrical members one of which is hollow and houses the other, which is smaller, within the hollow interior eccentrically to define between their opposing surfaces a horn angle terminating at a compression nip. The inner surface of the hollow outer member and the outer surface of the inner member both are liquid impervious, continuous and non-variant in curvature. Means are provided to rotate both members in a selected direction to draw a liquid-solid mixture through the horn angle thereby squeezing liquid from the solid at the compression nip. Means are provided to introduce such mixture into the hollow interior as well as means to remove the separated liquids and solids.

IN THE DRAWING

FIG. 1 is a partially sectional view of one form of the apparatus of the present invention taken at right angles to the longitudinal axes of the rotating members;

FIG. 2 is an enlarged cross-sectional view of FIG. 1 taken along line 2—2;

FIG. 3 is an enlarged cross-sectional view of FIG. 1 taken along line 3—3;

FIG. 4 is an enlarged cross-sectional view of the adjustable yoke in the apparatus of FIG. 1 taken along line 4—4; and FIG. 5 is an enlarged fragmentary sectional view of one means to remove dried material from the apparatus.

DESCRIPTION OF THE PREFERRED EMBODIMENT

Referring to the drawings, the illustrated embodiment comprises a hollow cylindrical housing shown generally at 10 including a liquid impervious continuous lateral inner wall 12 non-variant in curvature. Wall 12, which in the embodiment shown forms the inner surface of a cylinder, is rotatably mounted between a pair of end members 14 and 16 through a pair of liquid seal members such as shown diagrammatically at 18 in FIG. 5, of a type commonly used in industry for such purposes.

Mounted within the hollow interior of the housing is inner member 20 having a liquid impervious continuous non-variant outer surface 22. Inner member 20 is carried within the housing hollow interior eccentrically with respect to the longitudinal axis of the housing inner wall but with its own longitudinal axis substantially parallel to the longitudinal axis of the housing inner wall so that a substantially non-variant, uniform compression nip or gap 24 is provided between such cylindrical surfaces. The inner member extends between end members 14 and 16 and is rotatably mounted between such end members through a second pair of liquid seal members (not shown). Thus, a horn angle h is formed between wall 12 and surface 22.

Secured between the end members, within the hollow interior, is a baffle or doctor plate 26, shown in FIGS. 2 and 3 to be adjustable along slot 27, but which baffle can be a relatively flat plate. A first edge 28 of the baffle 26 is in rotating liquid sealing contact relationship with inner wall 12 and a second edge 30 of the baffle is in operative, preferably rubbing, liquid sealing contact relationship with outer surface 22 of the inner member 20. Thus, baffle 26 divides the hollow interior into a wet material section 32 and a dried material section 34. Preferably the baffle is biased such as through slot 27 to press edges 28 and 30 more securely against the cooperating surfaces.

The apparatus is provided with a solid-liquid mixture inlet port 36 in FIG. 3 through an end wall, for example 16 in the drawing, communicating with wet material section 32. Inlet port 36 preferably is near the bottom of wet section 32 because of the generally greater density of the mixture compared with the liquid. Also communicating with such wet section is a liquid outlet port such as 38 in FIG. 2 through an end member to provide communication between the hollow interior of the wet section and a liquid filter means such as filter or sieve 40 in FIG. 1. Such outlet port 38 preferably is near the top of wet material section 32 because of the generally higher density of liquids such as water and the fact that the upper area of the wet section will include more dilute mixture. Such dilution occurs from liquid expressed at the nip 24 back into horn angle h.

If it is desired to increase capacity or to adjust the density or consistency of the incoming mixture, a prefilter means, similar to filter or sieve 40, but not shown, can be included in conduit 68 in FIG. 1, ahead of inlet port 36.

Included in an end wall, such as 16, is a dried material outlet port 42 in FIG. 3 through which can be introduced means to remove dried material from the dried material section 34 of the hollow interior. For example, a screw conveyor 44, shown in FIG. 1 and in more detail in FIG. 5 can be introduced through an end wall such as 16 to draw dried material from the hollow interior of the apparatus and discharge it such as through conduit 46. Such screw conveyor can be driven by rotating means such as motor 48. In another form of the apparatus of the present invention, and in accordance with one aspect of the method of this invention, there can be provided a compressed gas inlet such as through end member 14, for example in line with the position of screw conveyor 44 in FIG. 2 to direct a flow of gas, such as air under pressure, toward outlet port 42 in FIG. 3. In this embodiment, screw conveyor 44 and motor 48 can be eliminated and dried material can be blown directly through conduit 46 in FIG. 1. In addition, the introduction of gas pressure into dried material section 34 can assist baffle edges 28 and 30 in sealing the wet material section 32 from dried material section 34. In addition, such gas can be dried or can be preheated or precooled to a desired temperature, for example, to sterilize or to refrigerate the dried material.

The housing inner wall 12 and the inner member outer surface 22 are both rotated in a selected direction, for example represented by arrows 50a and 50b in FIGS. 2 and 3. Such rotation can be accomplished in a variety of ways. For example, the housing can be driven through a pair of cooperating gears 52 and 54 in FIGS. 1 and 2 by a motor 56. Similarly, inner member 20 can be rotated on a shaft 58 through motor 60, shown to be by a direct drive. As will be appreciated, motors 56 and 60 can be adjustable to provide the desired relative rotation between housing inner wall 12 and outer surface 22 of the inner member.

In order to adjust the relative spacing at nip 24, shaft 58 which carries the inner member 20 can be journaled in a pair of adjustable yokes shown generally at 62 and in more detail in FIG. 4. By adjustment of screws 64, outer surface 22 of the inner member can be adjusted in respect to its relative position opposite housing inner wall 12.

As shown in the drawing, the apparatus can be carried on a support such as cradle 66. If desired to reduce vibrations, shock absorbing means (not shown) can be provided. However, it will be appreciated that the apparatus can be sized or mounted in a variety of ways well known in the art depending upon the location and intended application of the apparatus of the present invention. Also, it will be appreciated that inner member 20 can be positioned at a variety of points around inner wall 12 depending on the size of the apparatus and the capacity desired in the wet or dried material sections.

As was mentioned before, the apparatus of the present invention can be adapted to operate at a selected elevated temperature for a variety of reasons. For example, sterilization of the liquid or solids or both, as in environmental control applications, can be accomplished during separation. Also, reduced liquid viscosity can be achieved. It will be appreciated by those skilled in the art that the apparatus can be heated in a variety of ways. For example, steam or heated gas or vapor can be passed through the interior of inner member 20, being introduced and discharged through the ends of shaft 58. Similarly a heating medium, such as steam, can be introduced with the liquid - solid mixture. Also, the apparatus can be jacketed to receive heat as through electric heating coils, steam, etc. Similarly, for reduced temperature processing, such as in the food industry, the apparatus of the present invention can include refrigeration means, for example, within inner member 20 or jacketed around housing 10.

In operation, a flowable solid-liquid mixture from a source, not shown, is introduced, such as by gravity through conduit 68 in FIG. 1 into the wet material section 32 of the hollow interior of the apparatus through inlet port 36. With the housing inner wall 12 and the inner cylinder outer surface 22 rotating as shown by arrows 50a and 50b in FIGS. 2 and 3, the mixture, which is allowed to fill wet material section 32, preferably is under pressure such as static pressure resulting from an elevated source. The mixture is drawn through the horn angle h defined by surfaces 12 and 22 into nip 24. Then pressure between the surfaces continuously and instantaneously squeezes liquid from the solid component of the mixture and confines it in wet material section 32. The liquid, which generally is lower in density than is the mixture, accumulates near the top portion of the wet material section and then is conducted through conduit 70 into a liquid filtering means such as filter or sieve 40. A variety of such filtering devices or combinations of devices are commercially available, having been designed for such use as in the pulp and paper industry and by food processors. One such device is described in more detail in U.S. Pat. No. 3,451,555 — Ginaven, issued June 24, 1969. In such a device, liquid is discharged through conduit 76 and solids into a receiver such as tray or bin 78. If desired, such solids can be recirculated for additional drying.

After passing through nip 24, the solid dried material is ejected into dried material section 34 where it can be removed by such means as screw conveyor 44 or compressed gas as has been described, or combinations of means, through dried material outlet port 42 and then through conduit 46. If material adheres to surfaces 12 and 22 after it has passed through nip 24, baffle edges 28 and 30, preferably in contact with such surfaces, remove adherent material. Because of the potential wear of edges 28 and 30, adjustable or biasing means, represented at 74 in slot 27 in FIGS. 2 and 3, can be provided to maintain baffle edges 28 and 30 in contact respectively with surfaces 12 and 22.

Through the use of liquid impervious, continuous, non-variant surfaces 12 and 22 rather than the perforated or filtering type surfaces frequently found in apparatus used for a purpose similar to that of the present invention, and because of the horn angle formed, extremely high pressures can be attained at nip 24. The horn angle formed between the two curved surfaces draws the solid-liquid mixture from the wet material section into the nip and dries it continuously and instantaneously because of the externally controlled pressure. Very high pressures, for example up to 100,000 pounds per linear inch, can be produced between such two rolling surfaces with substantially no effect on efficiency. Provision in the apparatus of the present invention of two surfaces each of which is liquid impervious, continuous and non-variant in curvature, allows development through the horn angle of pressures otherwise unattainable through the use of surfaces through which liquid can pass. in addition, drawing power of the horn angle is thus enhanced.

Because the cooperating surfaces of the horn angle are non-porous such as would be the case with screens or sieves, no periodic cleaning of such openings or disassembly of equipment is required in the apparatus of the present invention. Thus, there is afforded a more easily and therefore more economically constructed apparatus requiring less maintenance. Also, liquid can be channeled into separate, associated apparatus directly from the wet material section, which is constantly being diluted automatically from the liquid being forced from material passing through the nip back into the wet material section.

Although the present invention has been described in detail in connection with a specific embodiment, those skilled in the art to which the present invention relates will understand the variations and modifications of which the invention is capable.

What is claimed is:

1. Improved apparatus for continuously separating liquid and solid from a flowable solid-liquid mixture comprising:

a housing having a hollow interior defined by a liquid impervious, continuous, non-variant lateral inner wall of cylindrical cross section and a pair of end members each having a liquid impervious inner end wall;

the housing rotatably connected with each end member respectively through a first pair of liquid seal members;

means to rotate the housing inner wall about its longitudinal axis in a selected direction;

an inner member having a liquid impervious, continuous, non-variant outer surface of cylindrical cross section smaller in diameter than the cross section of the housing inner wall and unyieldingly mounted within the housing hollow interior, eccentrically with respect to the longitudinal axis of the housing inner wall, and having a longitudinal axis substantially parallel to the longitudinal axis of the housing inner wall so that the inner member outer surface approaches the housing inner wall at a horn angle across a substantially non yielding compression nip substantially parallel to the longitudinal axes of the housing inner wall and of the inner member;

the inner member extending between the end members and rotatably connected with each end member through a second pair of liquid seal members;

means to rotate the inner member about its longitudinal axis in the selected direction;

a baffle including first and second edges secured between the end members within the hollow interior and projecting between and biased to press the first and second edges into liquid sealing relationship with the inner member outer surface and with the housing inner wall thereby separating the housing hollow interior into a wet material section and a dried material section;

an inlet port through an end wall in the wet material section;

means to introduce the solid-liquid mixture into the wet material section through the inlet port;

a liquid outlet port through an end wall in the wet material section;

liquid filtering means connected with the liquid outlet port;

a dried material outlet port in an end wall in the dried material section; and means to remove dried material from the dried material section through the dried material outlet port.

2. The apparatus of claim 1 including, in addition, heating means to provide heat to the housing hollow interior.

3. The apparatus of claim 1 including, in addition, cooling means to cool the hollow interior.

* * * * *